(12) United States Patent
Røn Pedersen et al.

(10) Patent No.: US 11,804,762 B2
(45) Date of Patent: Oct. 31, 2023

(54) FLYWHEEL SYSTEMS AND FLYWHEEL BEARING MODULES

(71) Applicant: MAERSK DRILLING A/S, Kgs. Lyngby (DK)

(72) Inventors: John Røn Pedersen, Frederikssund (DK); Martin Speiermann, Brønshøj (DK); Jamshid Zamany, Hvidovre (DK)

(73) Assignee: WattsUp Power A/S, Hvidovre (DK)

( * ) Notice: Subject to any disclaimer, the term of this patent is extended or adjusted under 35 U.S.C. 154(b) by 0 days.

(21) Appl. No.: 18/100,970

(22) Filed: Jan. 24, 2023

(65) Prior Publication Data

US 2023/0163673 A1    May 25, 2023

Related U.S. Application Data

(63) Continuation of application No. 17/682,331, filed on Feb. 28, 2022, now Pat. No. 11,594,945, which is a continuation of application No. 16/758,298, filed as application No. PCT/DK2018/050265 on Oct. 22, 2018, now Pat. No. 11,264,876.

(Continued)

(30) Foreign Application Priority Data

Sep. 26, 2018 (DK) .......................... PA 2018 00643

(51) Int. Cl.
*H02K 21/22* (2006.01)
*H02K 11/21* (2016.01)
*H02K 7/09* (2006.01)

(52) U.S. Cl.
CPC ............ *H02K 21/222* (2013.01); *H02K 7/09* (2013.01); *H02K 11/21* (2016.01)

(58) Field of Classification Search
CPC ........ H02K 11/21; H02K 7/09; H02K 21/222; H02K 7/025; H02K 2213/06; Y02E 60/16
See application file for complete search history.

(56) References Cited

U.S. PATENT DOCUMENTS 4,700,094 A * 10/1987 Downer .............. F16C 32/0485
310/90.5
2007/0080594 A1 * 4/2007 Gachter ............. F16C 32/0457
310/90.5

(Continued)

*Primary Examiner* — Naishadh N Desai
(74) *Attorney, Agent, or Firm* — Cozen O'Connor

(57) ABSTRACT

A flywheel system includes a fixture providing a base and a stator, rotor having a cavity to receive the stator, a generator/motor module having a plurality of permanent magnets mechanically coupled to the rotor and an active magnetic bearing module. The active magnetic bearing module includes a plurality of magnetizable elements mechanically coupled to or integrated in the rotor, and a plurality of electromagnets mechanically coupled to a shaft and configured to magnetically couple with the plurality of first magnetizable elements to actively stabilize the rotor relative to the fixture. The windings of the generator/motor module are arranged around the rotation axis of the rotor at a first distance from the rotation axis of the rotor, the electromagnets of the active magnetic bearing module are arranged around the rotation axis of the rotor at a second distance, and the first distance is greater than or equal to the second distance.

20 Claims, 9 Drawing Sheets

Related U.S. Application Data

(60) Provisional application No. 62/575,489, filed on Oct. 22, 2017.

(56) References Cited

U.S. PATENT DOCUMENTS

| | | | |
|---|---|---|---|
| 2016/0285341 A1* | 9/2016 | Sung | F16C 32/0438 |
| 2017/0167943 A1* | 6/2017 | Schroeder | F16C 32/048 |
| 2017/0298985 A1* | 10/2017 | Brakensiek | D01H 4/12 |

* cited by examiner

FLYWHEEL SYSTEMS AND FLYWHEEL BEARING MODULES

CROSS-REFERENCE TO RELATED APPLICATIONS

The present application is a continuation of U.S. patent application Ser. No. 17/682,331 filed Feb. 28, 2022, which is a continuation of U.S. patent application Ser. No. 16/758,298 filed Apr. 22, 2020, which is a 35 U.S.C. § 371 filing of International Application No. PCT/DK2018/050265 filed Oct. 22, 2018, which claims the benefit of priority to U.S. Provisional Application No. 62/575,489, filed Oct. 22, 2017, and Danish Patent Application No. PA 2018 00643 filed Sep. 26, 2018, each of which is incorporated herein by reference in its entirety.

BACKGROUND

A flywheel system is a mechanical device that stores rotational energy in a mass. The amount of energy stored in the rotor is proportional to the square of the rotor's rotational speed. The rotor may be magnetically coupled with an electromagnetic generator stator to allow the flywheel system to convert between rotational energy of the rotor and electrical energy. The generator stator may decelerate the rotor to produce electrical energy from the rotational energy extracted from the rotor, and the generator stator may receive electrical energy and convert this electrical energy to rotational energy of the rotor resulting in acceleration of the rotor. Flywheel systems may be designed to have large energy storage capacity, and are further capable of both delivering and absorbing energy rapidly. Common uses of a flywheel system include (a) peak-shaving of the power output of another energy source such as a combustion generator stator, (b) energy storage, (c) backup power supply, and (d) rapid energy delivery.

Low-loss energy storage in a flywheel system requires that the rotor rotates with very little friction. Therefore, the rotor of a high-performance flywheel system typically is magnetically levitated.

SUMMARY

In an embodiment, a flywheel system includes a rotor configured to rotate about a rotation axis. The flywheel system further includes a fixture and an active magnetic bearing module for actively stabilizing the rotor relative to the fixture. The active magnetic bearing module includes a plurality of first magnetizable elements mechanically coupled to or integrated in the rotor, and a plurality of electromagnets mechanically coupled to the fixture and configured to magnetically couple with the plurality of first magnetizable elements to actively stabilize the rotor relative to the fixture. Each of the first magnetizable elements is farther than each of the electromagnets from the rotation axis.

Optionally, each of the first magnetizable elements is a soft magnetic composite.

Optionally, the first magnetizable elements are arranged along a first diameter about the rotation axis, the electromagnets being arranged along a second diameter about the rotation axis, the first diameter being greater than the second diameter.

Optionally, in dimensions orthogonal to the rotation axis, the electromagnets and the first magnetizable elements are away from each other by a first radial gap, the first radial gap being in range between 2 and 10 millimeters.

Optionally, extent, along the rotation axis, of the first magnetizable elements exceeding extent along the rotation axis, of the electromagnets.

Optionally, the rotor forms a first void encircling the rotation axis, the plurality of first magnetizable elements being positioned at a first surface of the first void that encircles the rotation axis and faces the rotation axis, each of the electromagnets being positioned in the first void to magnetically couple with the first magnetizable elements across a portion of the first void.

Optionally, permanent magnets are mechanically coupled to or integrated in the rotor and positioned at a second surface of the first void that encircles the rotation axis; and a generator stator is mechanically coupled to the fixture and positioned in the first void to magnetically couple with the permanent magnets, so as to convert between rotational energy of the rotor and electric current in windings of the generator stator.

Optionally, the fixture comprises an endplate positioned adjacent a top end or a bottom end of the rotor, the electromagnets and the generator stator being attached to the endplate.

Optionally, the generator stator is between the electromagnets and the endplate, the second surface being closer than the first surface to the endplate.

Optionally, the electromagnets are between the generator stator and the endplate, the first surface being closer than the second surface to the endplate.

Optionally, the endplate forms a base adjacent the bottom-end, the flywheel system further comprises: first load bearing magnets mechanically coupled to or integrated in the rotor at bottom surface of rotor; second load bearing magnets, mechanically coupled to the base, for magnetically coupling with the first load bearing magnets to magnetically levitate the rotor above the base.

Optionally, in the first void, there is at least one passive magnetic bearing for stabilizing the rotor relative to the fixture if the active magnetic bearing loses power, each passive magnetic bearing comprising: second permanent magnets mechanically coupled with the rotor; and third permanent magnets mechanically coupled to the fixture and positioned in the first void to magnetically couple with the second permanent magnets, so as to provide backup stabilization of the rotor relative to the fixture.

Optionally, the at least one passive magnetic bearing comprises a plurality of passive magnetic bearings located in different respective positions.

Optionally, in dimensions orthogonal to the rotation axis, the electromagnets and the first magnetizable elements are apart from each other by a first radial gap, and the generator stator and the permanent magnets are apart from each of by a second radial gap that exceeds the first radial gap.

Optionally, each of the first surface and the second surface facing the rotation axis, the first surface and the second surface are respective portions of a common cylindrical surface.

Optionally, each of the first surface and the second surface facing the rotation axis, diameter of the first surface are different from diameter of the second surface.

Optionally, each of the first surface and the second surface facing the rotation axis, the first void span across the rotation axis.

Optionally, the first void is a groove that encircles the rotation axis but does not coincide with the rotation axis, the rotor further forms a central void closer than the groove to the rotation axis, the flywheel system further comprising: permanent magnets are mechanically coupled to or integrated in the rotor and positioned at a second surface of the central void that faces and encircles the rotation axis; and a generator stator is mechanically coupled to the fixture and positioned in the central void to magnetically couple with the permanent magnets, so as to convert between rotational energy of the rotor and electric current in windings of the generator stator.

Optionally, the fixture comprises an endplate positioned adjacent a top end or bottom end of the rotor, the electromagnets and the generator stator being attached to the endplate.

Optionally, the endplate forms a base positioned adjacent the bottom end of the rotor, the flywheel system further comprising: first load bearing magnets mechanically coupled to or integrated in the rotor at bottom surface of rotor; and second load bearing magnets, mechanically coupled to the base, for magnetically coupling with the first load bearing magnets to magnetically levitate the rotor above the base.

Optionally, in one or both of the groove and the central void, there is at least one passive magnetic bearing for stabilizing the rotor relative to the fixture if the active magnetic bearing loses power, each passive magnetic bearing comprising: second permanent magnets mechanically coupled to or integrated in the rotor; and third permanent magnets mechanically coupled to the fixture and positioned in the groove or the central void to magnetically couple with the second permanent magnets, so as to provide backup stabilization of the rotor relative to the fixture.

Optionally, the at least one passive magnetic bearing comprises a plurality of passive magnetic bearings located in different respective positions.

Optionally, there is a power supply for powering the plurality of electromagnets to adjust position of the rotor relative to the fixture; and at least one sensor for sensing a movement characteristic of the rotor relative to the fixture, the at least one sensor being communicatively coupled with the power supply to enable adjustment of the position of the rotor relative to the fixture in response to the movement characteristic.

Optionally, there is at least one passive backup bearing including second permanent magnets for stabilizing the rotor relative to the fixture if the power supply fails to provide power to one or more of the plurality of electromagnets.

In an embodiment, a bearing module for a flywheel system includes a plurality of first magnetizable elements arranged along a first diameter and configured to be mechanically coupled to a rotor of the flywheel system, and a plurality of electromagnets configured to be mechanically coupled to a fixture and magnetically couple with the first magnetizable elements to stabilize the rotor relative to the fixture. The electromagnets are bounded by a second diameter that is smaller than the first diameter to enable positioning of the electromagnets inside the first diameter.

Optionally, each of the first magnetizable elements is a soft magnetic composite.

Optionally, there is at least one sensor for sensing a position characteristic of the rotor relative to the fixture; and a power supply, communicatively coupled with the at least one sensor, for powering the electromagnets to adjust position of the rotor relative to the fixture in response to the position characteristic.

Optionally, there is at least one passive magnetic bearing including (a) a plurality of first permanent magnets configured to be mechanically coupled to the rotor and (b) a plurality of second permanent magnets configured to be mechanically coupled to the fixture and magnetically couple with the first permanent magnets to stabilize the rotor relative to the fixture if the power supply fails to provide power to the electromagnets.

Optionally, there is a plurality of third permanent magnets arranged along a third diameter and configured to be mechanically coupled to the rotor; and a generator stator for magnetically coupling with the third permanent magnets, to convert between rotational energy of the rotor and electric current in windings of the generator stator.

Optionally, the generator stator is bounded by a fourth diameter that is smaller than the third diameter to enable positioning of the generator stator inside the third diameter.

Optionally, the electromagnets are mounted on the generator stator.

Optionally, there is first load bearing magnets configured to be mechanically coupled to the rotor; and second load bearing magnets configured to be mechanically coupled to the fixture and magnetically couple with the first load bearing magnets to magnetically levitate the rotor above the second load bearing magnets.

In an embodiment, a bearing module is integrated with a generator. The integrated bearing module and generator are configured for use in a flywheel system and include a plurality of permanent magnets, a generator stator, and an active magnetic bearing. The plurality of permanent magnets are arranged along a first diameter and configured to be mechanically coupled to a rotor of the flywheel system. The generator stator is configured to be mechanically coupled to a fixture. The generator stator is bounded by a second diameter that is smaller than the first diameter to enable positioning of the generator stator inside the first diameter to magnetically couple with the permanent magnets, so as to convert between rotational energy of the rotor and electric current in windings of the generator stator. The active magnetic bearing includes (a) a plurality of first magnetizable elements arranged along a third diameter and configured to be mechanically coupled to the rotor, and (b) a plurality of electromagnets arranged along a fourth diameter and configured to be mechanically coupled to the fixture and magnetically couple with the first magnetizable elements. The third diameter is greater than the first diameter to enable positioning of the first magnetizable elements at greater distance than the permanent magnets from rotation axis of the rotor. The fourth diameter is greater than the first diameter to enable positioning of the active magnetic bearing at greater distance than the permanent magnets from the rotation axis.

Optionally, each of the first magnetizable elements being a soft magnet.

Optionally, the fourth diameter is greater than the third diameter to enable positioning of the first magnetizable elements closer than the electromagnets to the rotation axis.

Optionally, the fourth diameter is smaller than the third diameter to enable positioning of the first magnetizable elements farther than the electromagnets from the rotation axis.

Optionally, there is an endplate that forms at least a portion of the fixture, the generator stator and the electromagnets being mounted on the endplate.

Optionally, first load bearing magnets are configured to be mechanically coupled to the rotor; and second load bearing magnets configured to be mechanically coupled to the fixture and magnetically couple with the first load bearing magnets to magnetically levitate the rotor above the second load bearing magnets.

Optionally, there is at least one sensor for sensing a position characteristic of the rotor relative to the fixture; and a power supply, communicatively coupled with the at least one sensor, for powering the electromagnets to adjust position of the rotor relative to the fixture in response to the position characteristic.

Optionally, at least one passive magnetic bearing includes (a) a plurality of second permanent magnets configured to be mechanically coupled to the rotor and (b) a plurality of third permanent magnets configured to be mechanically coupled to the fixture and magnetically couple with the second permanent magnets to stabilize the rotor relative to the fixture if the power supply fails to provide power to the electromagnets.

DETAILED DESCRIPTION OF THE EMBODIMENTS

Flywheel systems are being considered for use in offshore or onshore environments not connected to a conventional electrical grid but instead relying on a so-called micro grid. In these environments, flywheel systems may serve as a source of energy and, for example, provide power functionalities such as peak-shaving or frequency control. In addition, flywheel systems may serve to rapidly meet a high, short-term power demand. When implemented in environments that are potentially unstable, such as onboard a drillship, a semisubmersible drilling platform, or another marine vessel, the flywheel system is subject to substantial forces which can affect both the performance and lifetime of the flywheel system.

Disclosed herein are active magnetic bearings configured to actively stabilize the rotor of a flywheel system relative to the foundation of the flywheel system. These active magnetic bearings enable implementation of flywheel systems in both offshore environments and unstable onshore environments such as locations subject to earthquakes. Herein, an "active magnetic bearing" refers to a bearing that is adjustable based upon an input signal. An active magnetic bearing may be coupled with one or more sensors in a feedback loop.

Figure 1:
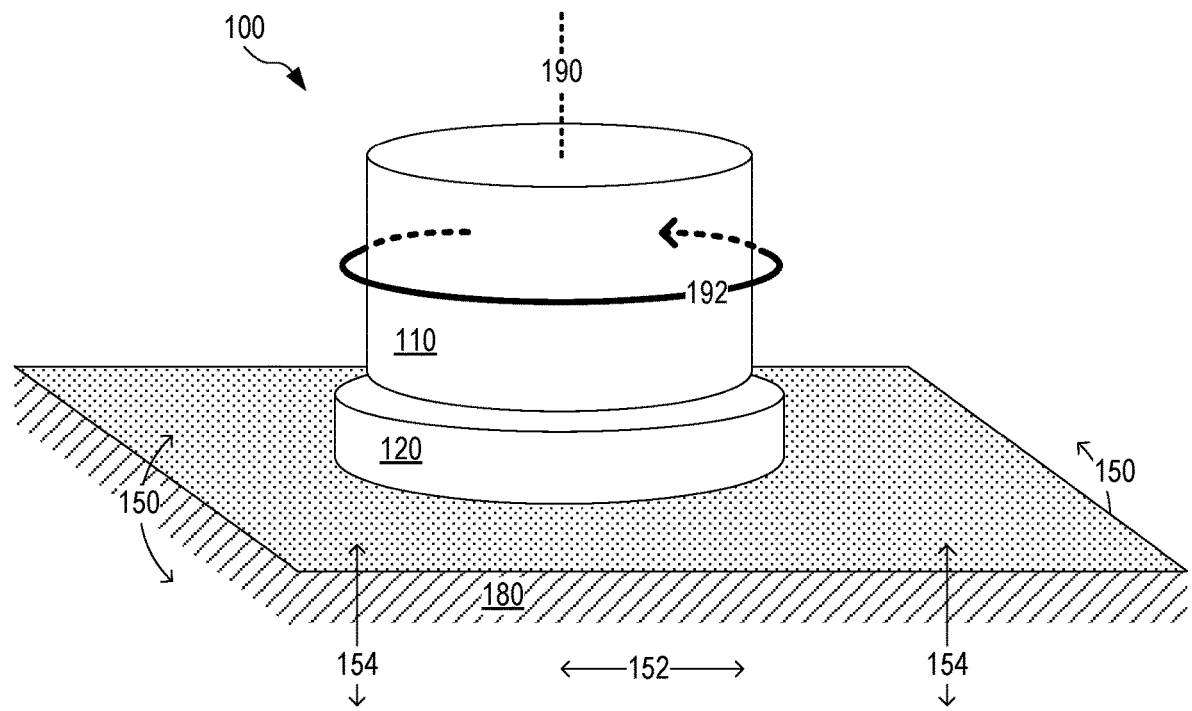
FIG. 1 illustrates a flywheel system in an exemplary use scenario, according to an embodiment.

FIG. 1 illustrates one flywheel system 100 in an exemplary use scenario including a rotor 110 and a fixture 120 that supports rotor 110. Rotor 110 is configured to rotate about a rotation axis 190, as indicated by arrow 192 or in the direction opposite arrow 192. Fixture 120 couples rotor 110 to a foundation 180, for example the floor of a building or a deck onboard a marine vessel. Fixture 120 is substantially rigidly coupled to foundation 180 and therefore moves with foundation 180 when foundation 180 moves. Foundation 180 may undergo movement in a variety of directions, for example horizontal translation as indicated by arrow 152, vertical translation as indicated by arrows 154, and rotation as indicated by 150, or a combination thereof. Fixture 120 may form part of a housing around rotor 110, such as a vacuum enclosure. In one example, the weight of rotor 110 is between 10 and 10,000 kilograms.

Figure 2:
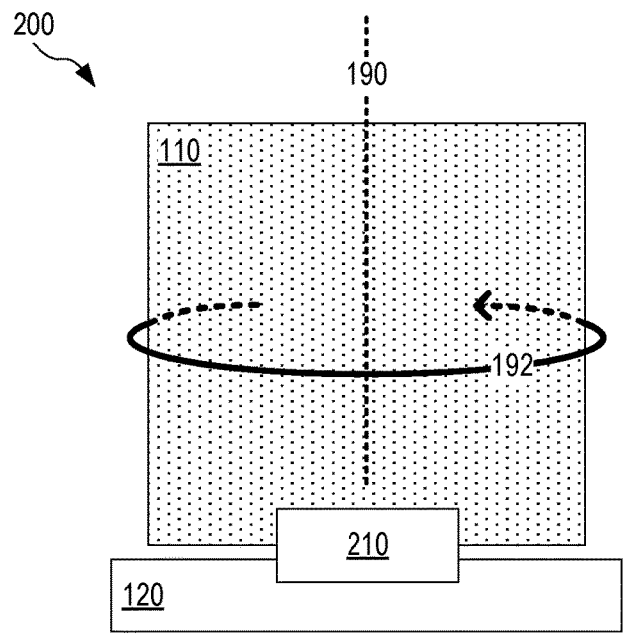
FIG. 2 illustrates a flywheel system that includes an active magnetic bearing to actively stabilize the rotor of the flywheel system relative to the foundation of the flywheel system, according to an embodiment.

FIG. 2 illustrates one flywheel system 200 that includes an active magnetic bearing to actively stabilize the rotor of the flywheel system relative to the foundation of the flywheel system. Flywheel system 200 is an embodiment of flywheel system 100 that further includes an active magnetic bearing 210 that utilizes magnetic coupling between rotor 110 and fixture 120 to stabilize rotor 110 relative to fixture 120. Active magnetic bearing 210 includes electromagnets to actively adjust the position of rotor 110 relative to fixture 120. Active magnetic bearing 210 may serve to maintain minimal or no friction during rotation of rotor 110 about rotation axis 190 and/or prevent damage to flywheel system 200 associated with excessive physical contact between rotor 110 and fixture 120. In one example, active magnetic bearing 210 ensures that the direction of rotation axis 190 remains sufficiently constant relative to fixture 120 to ensure satisfactory performance of flywheel system 200 and to prevent damage to flywheel system 200.

Figure 3:
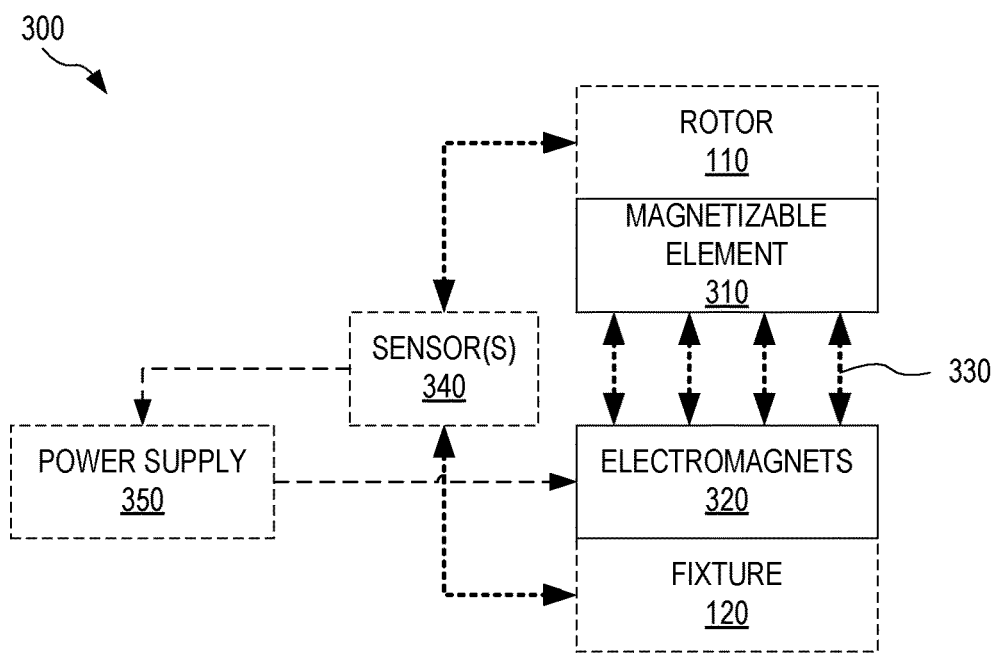
FIG. 3 schematically illustrates an active magnetic bearing module for a flywheel system, according to an embodiment.

FIG. 3 is a block diagram that schematically illustrates one active magnetic bearing module 300 for a flywheel system such as flywheel system 200. Active magnetic bearing module 300 is an embodiment of active magnetic bearing 210. Active magnetic bearing module 300 includes a plurality of magnetizable elements 310 and a plurality of electromagnets 320 configured to magnetically couple with magnetizable elements 310 as shown schematically by arrows 330. Each magnetizable element 310 may be a soft magnetic composite, a stack of laminated transformer steel, a stack of non-oriented electrical steel, or a magnetic material with intrinsic coercivity less than 1000 Ampere/meter. When active magnetic bearing module 300 is implemented in flywheel system 200, magnetizable elements 310 are mechanically coupled to rotor 110 or integrated in rotor 110, and electromagnets 320 are mechanically coupled to fixture 120. Electromagnets 320 enable active adjustment of the position of rotor 110 relative to fixture 120.

In an embodiment, active magnetic bearing module 300 further includes one or more sensors 340 and at least one power supply 350. In operation, sensor(s) 340 senses a property of the position or motion of rotor 110 relative to fixture 120 and communicates this property to power supply 350 which controls the current passing through one or more of electromagnets 320 according to the property.

Active magnetic bearing module 300 cooperates with rotor 110 and fixture 120 to form an embodiment of flywheel system 200.

Figure 4:
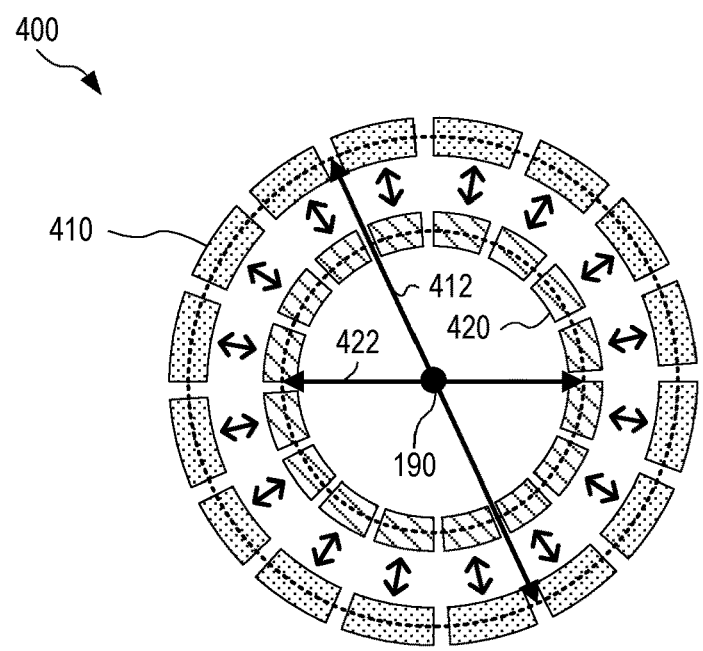
FIG. 4 illustrates an active magnetic bearing for use in a flywheel system, according to an embodiment.

FIG. 4 illustrates one active magnetic bearing 400 for use in a flywheel system. Active magnetic bearing 400 is an embodiment of magnetizable elements 310 and electromagnets 320 and may be implemented in flywheel system 200. Active magnetic bearing 400 includes (a) a plurality of magnetizable elements 410 arranged along a diameter 412 and (b) a plurality of electromagnets 420 arranged along a diameter 422 that is smaller than diameter 412 such that electromagnets 420 may be positioned within the ring of magnetizable elements 410. The number of magnetizable elements 410 and electromagnets 420 may be different from that shown in FIG. 4, without departing from the scope hereof. Also without departing from the scope hereof, the number of magnetizable elements 410 may be different from the number of electromagnets 420.

In one implementation of active magnetic bearing 400 in flywheel system 200, each of diameters 412 and 422 is centered about rotation axis 190, as illustrated.

Figure 5:
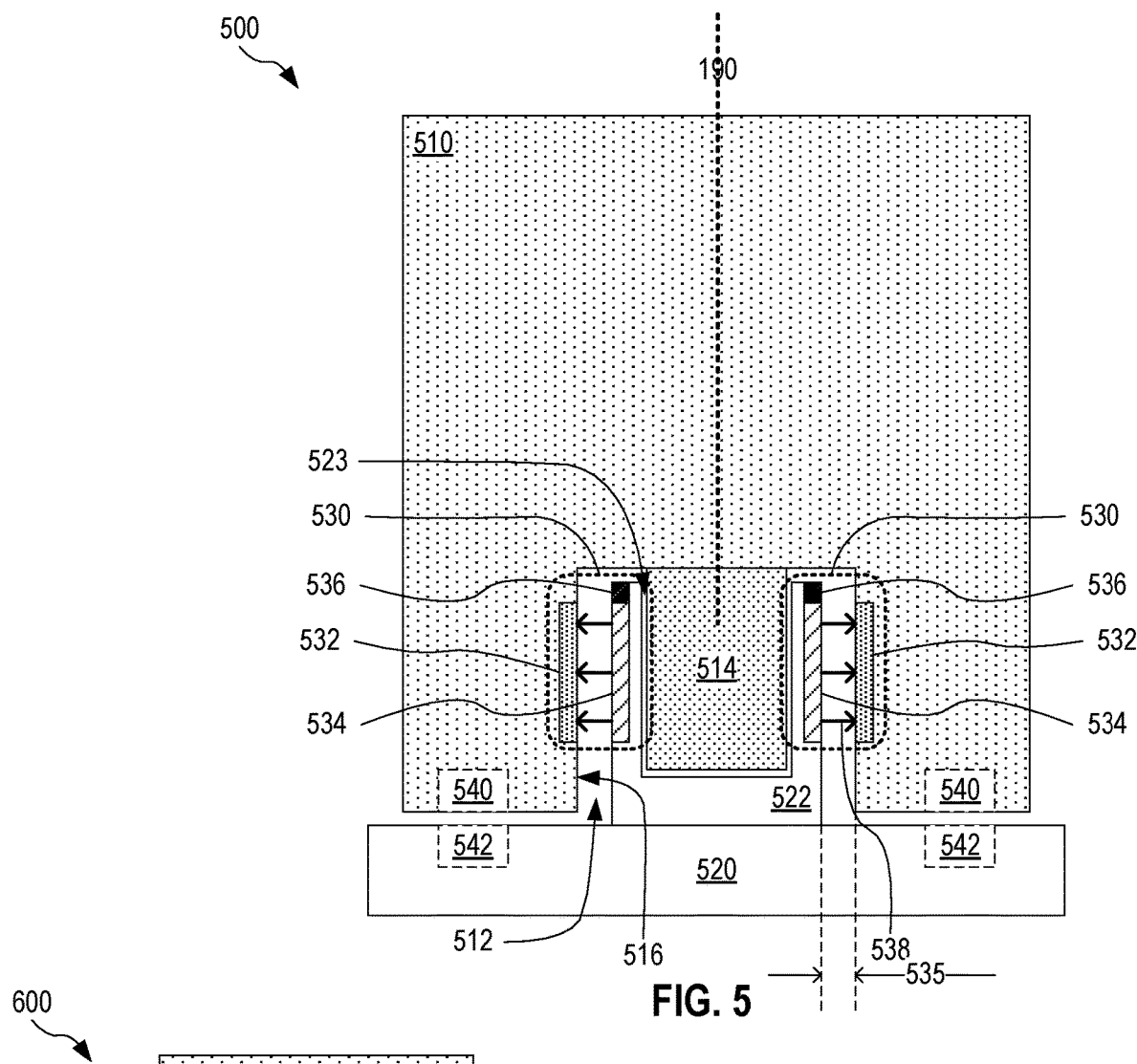
FIG. 5 illustrates a flywheel system having an active magnetic bearing positioned in a void of the rotor, according to an embodiment.

FIG. 5 illustrates one flywheel system 500 having an active magnetic bearing 530 positioned in a void of the rotor. Flywheel system 500 is an embodiment of flywheel system 200, and active magnetic bearing 530 is an embodiment of active magnetic bearing 400. Flywheel system 500 includes a rotor 510 and a fixture 520. Rotor 510 forms a void 512. Void 512 faces fixture 520 and encircles rotation axis 190. Void 512 may, but does not need to, span across rotation axis 190. A tip 514 extends from rotor 510 toward fixture 520. Without departing from the scope hereof, tip 514 may be omitted from flywheel system 500.

Active magnetic bearing 530 includes a plurality of magnetizable elements 532 mechanically coupled to, or integrated in, rotor 510 at a surface 516 of void 512 facing rotation axis 190. Active magnetic bearing 530 further includes a plurality of electromagnets 534 mechanically coupled to fixture 520 via a mount 522. Mount 522 may form a hollow 523 that accommodates tip 514. In embodiments that do not include tip 514, mount 522 may be solid across rotation axis 190. Electromagnets 534 are configured to magnetically couple with magnetizable elements 532 across the portion of void 512 between electromagnets 534 and magnetizable elements 532. The nominal radial gap 535 between magnetizable elements 532 and electromagnets 534, when rotor 510 is radially centered about mount 522, may be in the range between 2 and 10 millimeters. In operation, electromagnets 534 exert forces 538 on magnetizable elements 532 at surface 516 to actively stabilize rotor 510 relative to fixture 520.

The axial extent (along rotation axis 190) of magnetizable elements 532 may exceed the axial extent of electromagnets 534, such that the magnetic coupling between magnetizable elements 532 and electromagnets 534 is the same or similar even in the presence of axial movement of rotor 510 relative to fixture 520. In one implementation, the axial extent of magnetizable elements 532 exceed the axial extent of electromagnets 534 by 10% in both axial directions.

In an embodiment, active magnetic bearing 530 includes one or more sensors 536 that senses a property of the position and/or motion of rotor 510 relative to fixture 520. Sensor(s) 536 form an embodiment of sensor(s) 340. Flywheel system 500 may further include power supply 350 as discussed above in reference to FIG. 3.

Fixture 520 may be positioned below a bottom end of rotor 510 (as shown in FIG. 5) or above a top end of rotor 510. Herein, the "bottom end" and "top end" of a rotor refer to the bottom end and top end, respectively, of the rotor when the rotation axis is vertical. It is understood that a flywheel system may be oriented with a non-vertical rotation axis, for example prior to installation in an operating environment, or when the operating environment causes the orientation of a nominally vertical rotation axis to deviate from vertical (e.g., during movement and/or oscillation of the foundation supporting a flywheel system designed to operate with a generally vertical orientation axis). Similarly, the terms "above" and "below", as used herein, are referenced to the rotation axis. Fixture 520 is, for example, an endplate of a housing around rotor 510. In certain embodiments, fixture 520 is a base of flywheel system 500. In such embodiments, flywheel system 500 may further include a plurality of permanent magnets 540 mechanically coupled to rotor 510 and a plurality of permanent magnets 542 mechanically coupled to fixture 520. Permanent magnets 540 and 542 are configured to magnetically couple with each other to bear the load of rotor 510 so as to magnetically levitate rotor 510 above the base formed by fixture 520.

Without departing from the scope hereof, active magnetic bearing 530 may be provided as a standalone bearing to be implemented in a third party flywheel system. Active magnetic bearing 530 may be provided together with one or more of power supply 350, permanent magnets 540, and permanent magnets 542.

Figure 6:
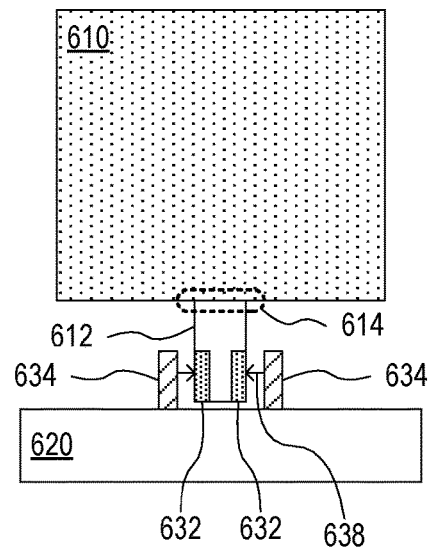
FIG. 6 illustrates an alternate flywheel system implementing an active magnetic bearing at a shaft of the flywheel system.

FIG. 6 illustrates an alternate flywheel system 600 implementing an active magnetic bearing at a shaft of the flywheel system. Flywheel system 600 includes a rotor 610, a shaft 612 attached to rotor 610 (or integrally formed therewith), and a base 620 positioned below a bottom end of rotor 610. Flywheel system 600 further includes (a) magnetizable elements 632 attached to shaft 612 and (b) electromagnets 634 extending up from base 620 to magnetically couple with magnetizable elements 632 on shaft 612. When utilizing electromagnets 634 to stabilize rotor 610 relative to base 620, electromagnets 634 exert forces 638 inward on shaft 612. These forces concentrate significant stress on the area 614 where shaft 612 and rotor 610 connect to each other.

In contrast, forces 538 in flywheel system 500 are directed outward onto a larger surface of rotor 510 and do not generate the stress caused by forces 638 in flywheel system 600. The configuration of flywheel system 500 thereby reduces or eliminates any adverse effect of active magnetic bearing 530 on the performance and lifetime of flywheel system 500.

Figure 7:
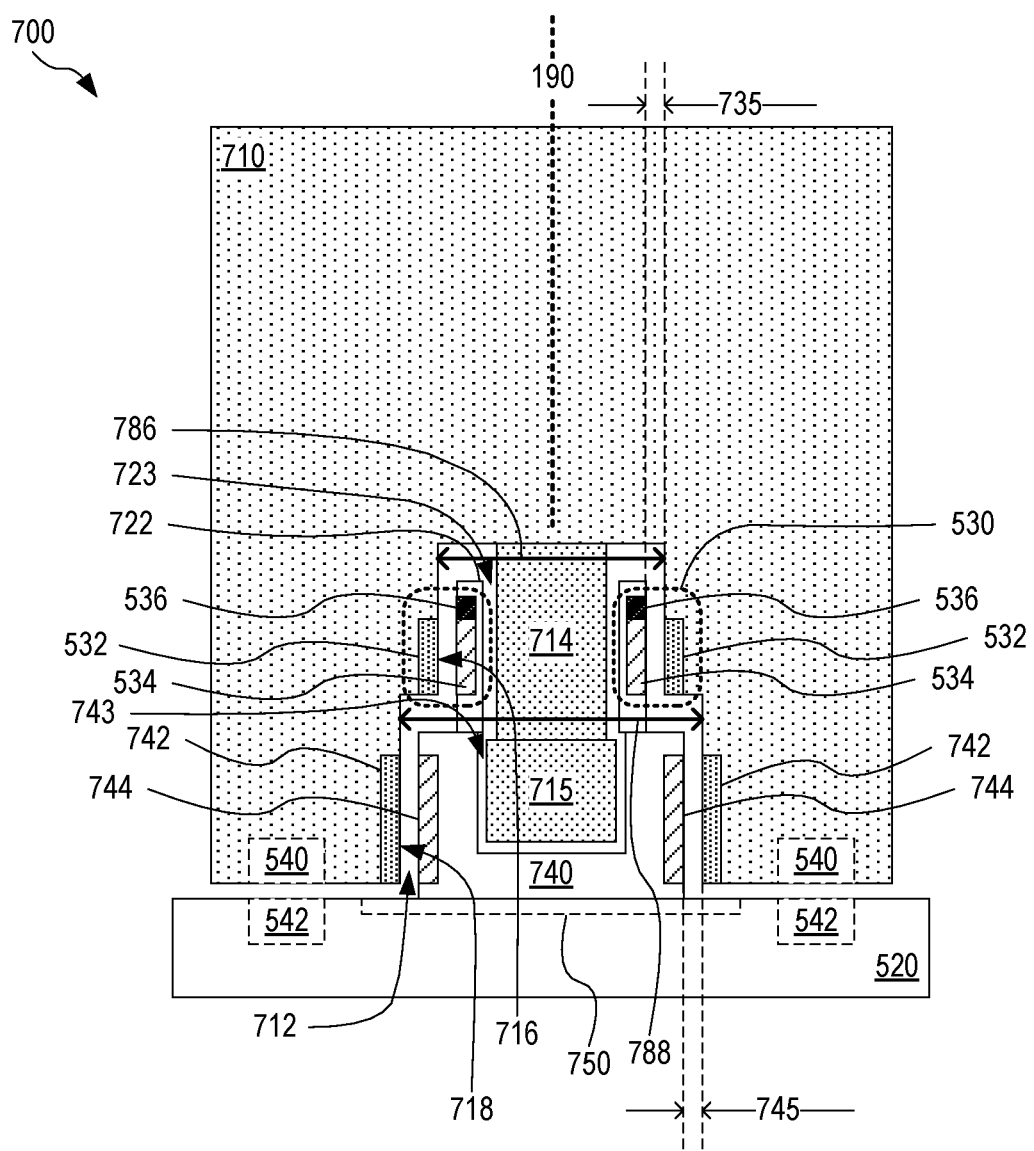
FIG. 7 illustrates a flywheel system having an active magnetic bearing that is integrated with a generator of the flywheel system, according to an embodiment.

FIG. 7 illustrates one flywheel system 700 having an active magnetic bearing that is integrated with a generator of the flywheel system. Flywheel system 700 is an embodiment of flywheel system 500. Flywheel system 700 includes a rotor 710 and fixture 520. Rotor 710 forms a void 712. A portion of void 712 closer to fixture 520 has diameter 788, and a portion of void 712 farther from fixture 520 has diameter 786. Flywheel system 700 includes (a) a plurality of permanent magnets 742 mechanically coupled to, or integrated in, rotor 710 at a surface 718 of void 712 characterized by diameter 788, and (b) a generator stator 740 mounted to fixture 520. Generator stator 740 includes a plurality of windings 744 that magnetically couple with permanent magnets 742 to convert between rotational energy of rotor 710 and electrical energy in windings 744. Generator stator 740 may function in both "generator mode" and "motor mode". In "generator mode", generator stator 740 decelerates the rotation of rotor 710 to generate electrical energy, in the form of electrical energy in windings 744, from rotational energy of rotor 710. In "motor mode", generator stator 740 uses electrical energy, supplied from an external source to windings 744, to accelerate the rotation of rotor 710 and thereby increase the rotational energy of rotor 710. In one implementation, windings 744 are water cooled, air cooled by forced air, or passively air cooled. Flywheel system 700 further includes active magnetic bearing 530 positioned in void 712. Flywheel system 700 implements magnetizable elements 532 at a surface 716 of void 712 characterized by diameter 786. Flywheel system 700 implements electromagnets 534, and optionally sensor(s) 536 in a mount 722 above generator stator 740.

A pair of tips 714 and 715 extend from rotor 710 toward fixture 520. Mount 722 and generator stator 740 may form respective hollows 723 and 743 to accommodate tips 714 and 715. Without departing from the scope hereof, tips 714 and 715 may be omitted from flywheel system 700.

Fixture 520 may be positioned below a bottom end of rotor 710 (as shown in FIG. 7) or above a top end of rotor 710. Fixture 520 is, for example, an endplate of a housing around rotor 710. In certain embodiments, fixture 520 is a base of flywheel system 700. In such embodiments, flywheel system 700 may further include permanent magnets 540 mechanically coupled to rotor 710 and permanent magnets 542 mechanically coupled to fixture 520, to magnetically levitate rotor 710 above the base formed by fixture 520.

In an embodiment, flywheel system 700 further includes a sensor array 750 positioned in fixture 520 or mechanically coupled to fixture 520. Sensor array 750 senses motion properties of fixture 520 and may serve to impose limitations on the operation of flywheel system 700 according to such motion properties. For example, the rate of acceleration and/or deceleration of rotor 710 may be limited during time periods when fixture 520 undergoes relatively large movement.

The nominal radial gap 735 (when rotor 710 is radially centered above generator stator 740 and mount 722) between magnetizable elements 532 and electromagnets 534 may be smaller than the nominal radial gap 745 between permanent magnets 742 and generator stator 740, so as to provide active stabilization with sufficient accuracy to ensure that permanent magnets 742 do not come into physical contact with any portion of generator stator 740. In one example, nominal radial gap 745 is at least twice the value of nominal radial gap 735. Nominal radial gap 735 may be similar to nominal radial gap 535.

Without departing from the scope hereof, diameters 786 and 788 may be identical such that surfaces 716 and 718 are respective portions of a common cylindrical surface.

Also without departing from the scope hereof, active magnetic bearing 530 and generator stator 740 may be provided as a standalone integrated bearing module to be implemented in a third party flywheel system. This integrated bearing module may further include one or more of mount 722, power supply 350, permanent magnets 540, and permanent magnets 542.

Figure 8:
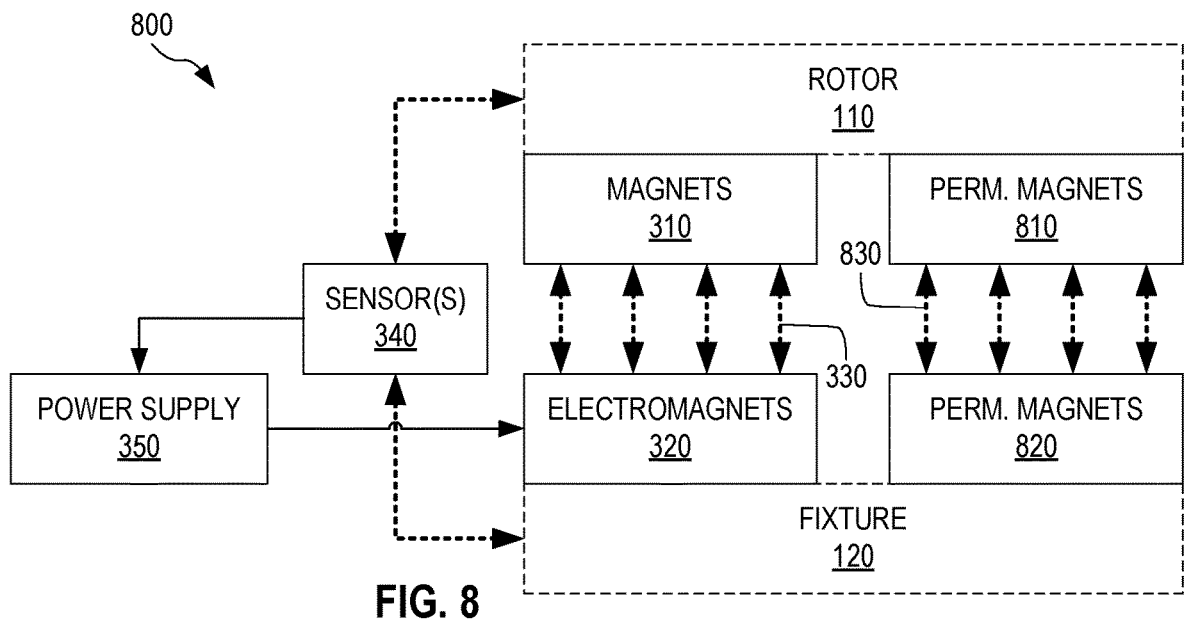
FIG. 8 illustrates a bearing module having both an active magnetic bearing and a passive magnetic backup bearing, according to an embodiment.

FIG. 8 illustrates one bearing module 800 having both an active magnetic bearing and a passive magnetic backup bearing. Bearing module 800 is an extension of active magnetic bearing module 300 that further includes permanent magnets 810 mechanically coupled to rotor 110 and permanent magnets 820 mechanically coupled to fixture 520. Permanent magnets 810 and 820 are configured to magnetically couple with each other (as indicated by magnetic coupling 830). In the event that electromagnets 320 should be incapable of sufficiently stabilizing rotor 110 relative to fixture 120, for example if power supply 350 fails, permanent magnets 810 and 820 form a passive magnetic bearing configured to provide at least some degree of stabilization of rotor 110 relative to fixture 120. The backup stabilization provided by permanent magnets 810 and 820 may be sufficient to prevent catastrophic damage of a flywheel system implementing bearing module 800 and, for example, safely stabilize rotor 110 during deceleration to a standstill.

Figure 9:
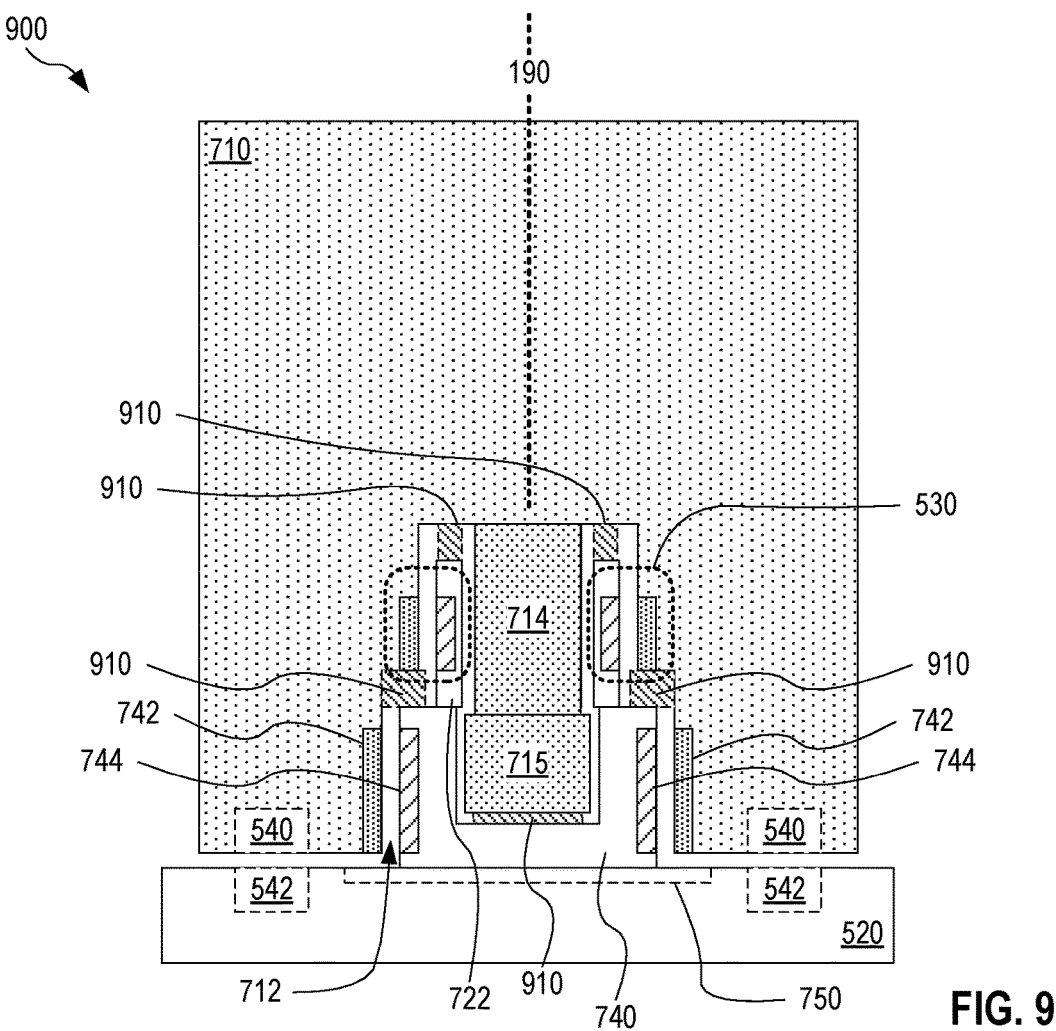
FIG. 9 illustrates a flywheel system that has an active magnetic bearing integrated with a generator of the flywheel system and further includes one or more passive magnetic backup bearings, according to an embodiment.

FIG. 9 illustrates one exemplary flywheel system 900 that has an active magnetic bearing integrated with a generator of the flywheel system and further includes one or more passive magnetic backup bearings. Flywheel system 900 is an embodiment of flywheel system 700 that further includes one or more passive backup bearings 910. Each bearing 910 includes permanent magnets 810 and 820 respectively coupled to rotor 710 and fixture 520 (directly or indirectly). FIG. 9 shows several exemplary locations of bearings 910. In embodiments including multiple bearings 910, smaller and/or less powerful permanent magnets 810 and 820 may suffice to achieve the same backup magnetic force as in embodiments utilizing a single, more powerful bearing 910. Without departing from the scope hereof, flywheel system 900 may include more or fewer bearings 910 than shown in FIG. 9, and bearing(s) 910 may be located in position(s) different from those shown in FIG. 9. Also without departing from the scope hereof, one or more bearings 910 may be implemented in flywheel system 500.

Also without departing from the scope hereof, active magnetic bearing 530, generator stator 740, and passive magnetic bearing(s) 910 may be provided as a standalone integrated bearing module to be implemented in a third party flywheel system. This integrated bearing module may further include one or more of mount 722, power supply 350, permanent magnets 540, and permanent magnets 542.

Figure 10:
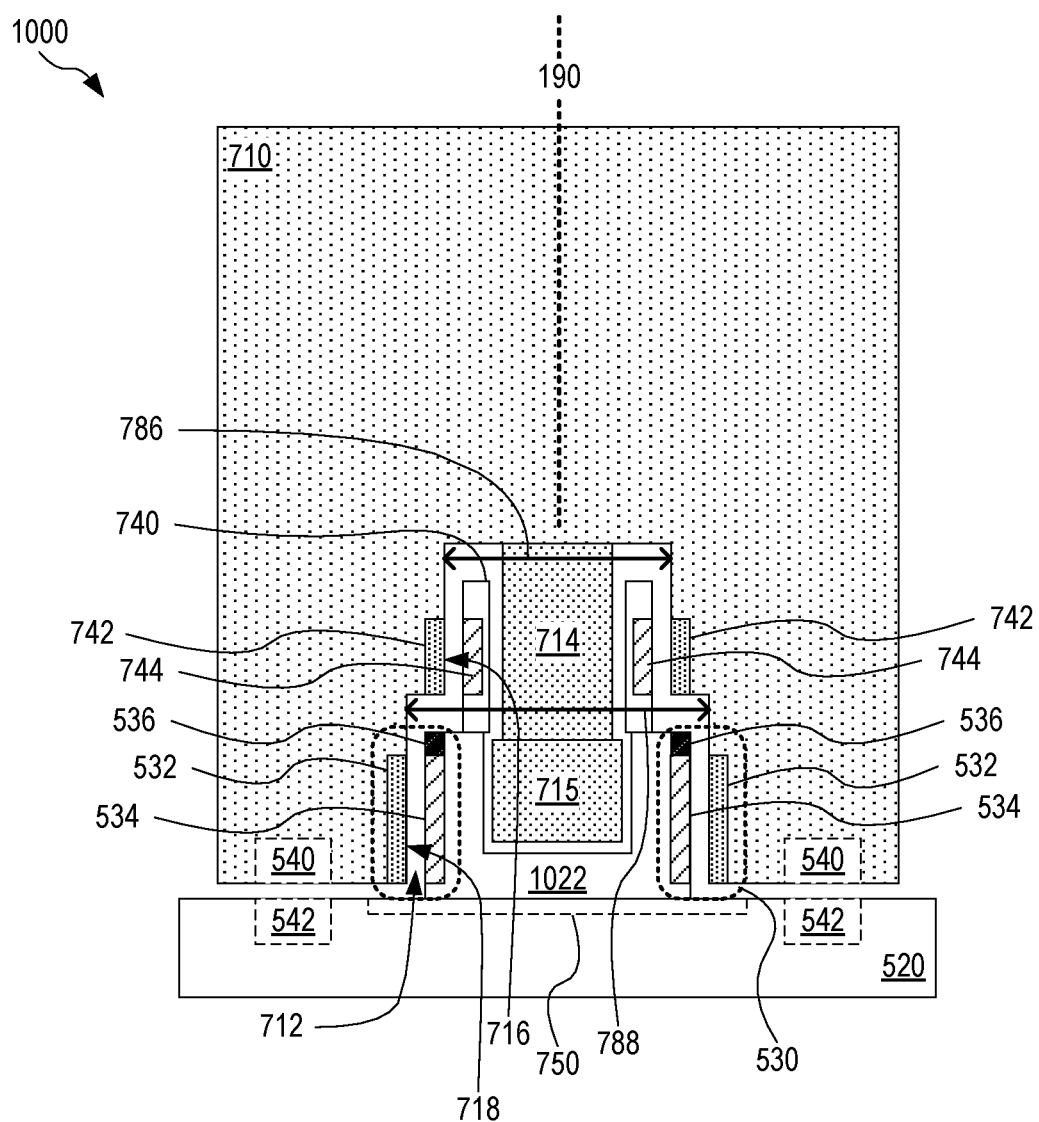
FIG. 10 illustrates another flywheel system having an active magnetic bearing that is integrated with a generator of the flywheel system, according to an embodiment.

FIG. 10 illustrates another flywheel system 1000 having an active magnetic bearing that is integrated with a generator of the flywheel system. Flywheel system 1000 is similar to flywheel system 700 except that, in flywheel system 700, generator stator 740 is closer than active magnetic bearing 530 to fixture 520 whereas, in flywheel system 1000, generator stator 740 is farther than active magnetic bearing 530 from fixture 520. In flywheel system 1000, generator stator 740 and permanent magnets 742 are in the portion of void 712 associated with surface 716, and active magnetic bearing 530 is in the portion of void 712 associated with surface 718. In flywheel system 1000, electromagnets 534 are mechanically coupled to fixture 520 via a mount 1022 that is similar to mount 722.

Although not shown in FIG. 10, it is understood that flywheel system 1000 may further include one or more passive backup bearings 910 as discussed above in reference to FIG. 9.

Figure 11:
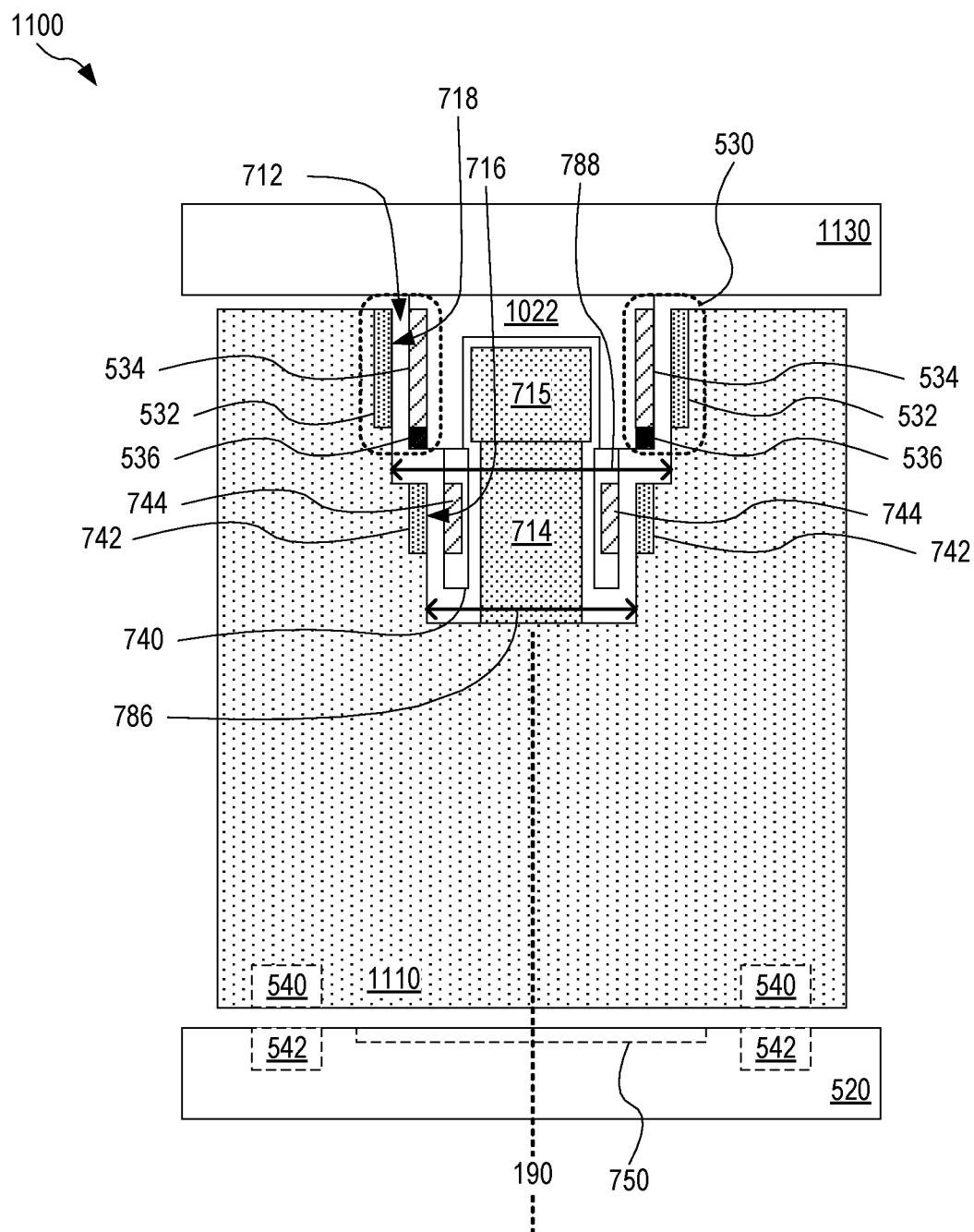
FIG. 11 illustrates a flywheel system having an active magnetic bearing that is integrated with a generator of the flywheel system with both the active magnetic bearing and the generator being mounted above a top end of the rotor of the flywheel system, according to an embodiment.

FIG. 11 illustrates one flywheel system 1100 having an active magnetic bearing that is integrated with a generator of the flywheel system with both the active magnetic bearing and the generator being mounted above a top end of the rotor of the flywheel system. Flywheel system 1100 is similar to flywheel system 1000. However, as compared to flywheel system 1000, rotor 710 is replaced by a rotor 1110 that is upside down relative to rotor 710 such that void 712 faces upwards. Mount 1022 and generator stator 740 are suspended from a top plate 1130 positioned above a top end of rotor 1110. In flywheel system 1100, top plate 1130 and fixture 520 may form respective endplates of a housing that encloses rotor 1110. It is understood that each of flywheel systems 700 and 900 may be modified in a similar manner with bearings and generator stator being suspended from above.

Figure 12:
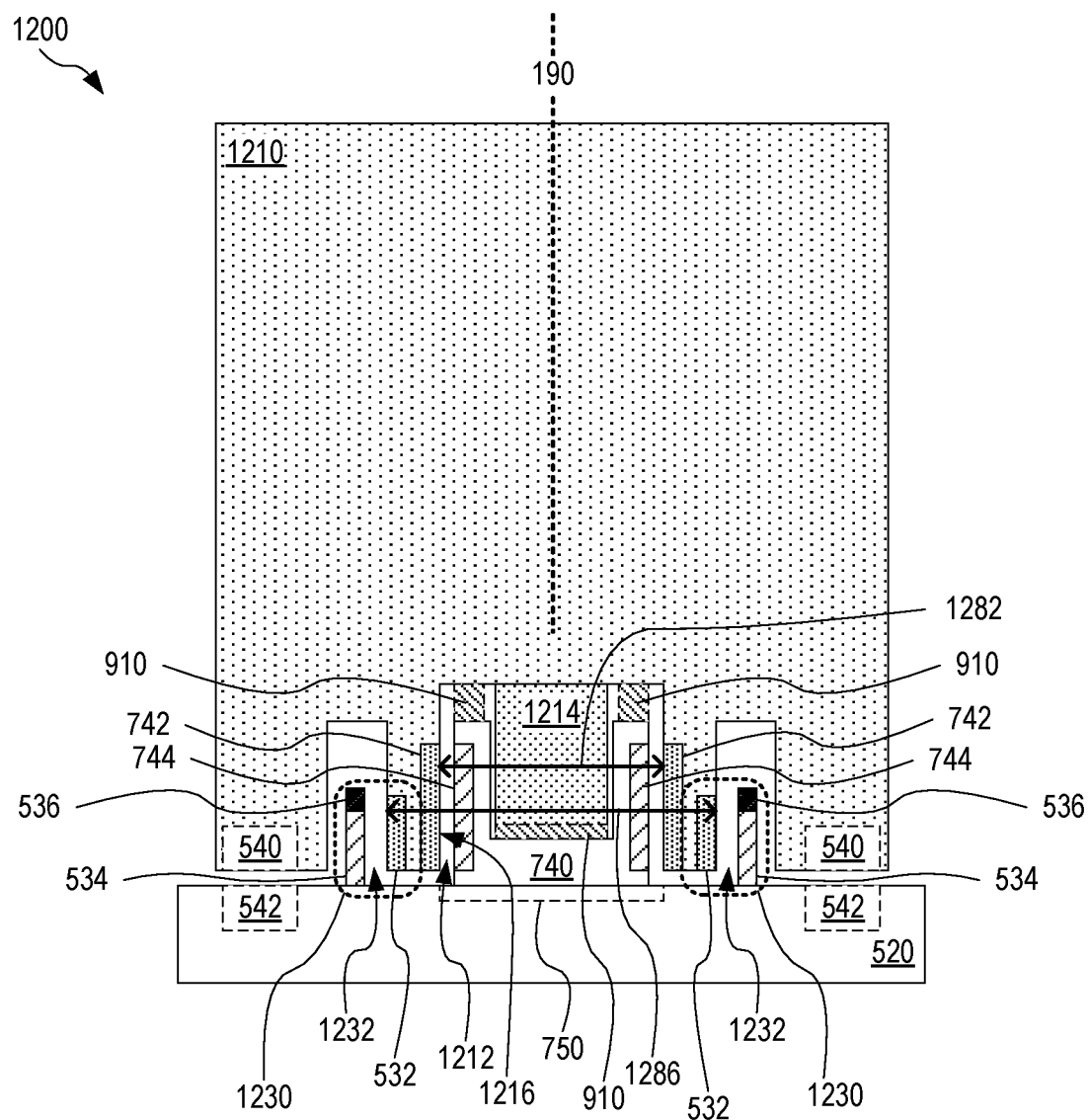
FIG. 12 illustrates a flywheel system including a generator and an active magnetic bearing positioned at greater radii than the generator, according to an embodiment.

FIG. 12 illustrates one flywheel system 1200 including generator stator 740 and an active magnetic bearing 1230 positioned at greater radii than generator stator 740. Flywheel system 1200 is an embodiment of flywheel system 500. Flywheel system 1200 includes fixture 520 and a rotor 1210. Rotor 1210 forms (a) a groove 1232 encircling rotation axis 190 and having an inner diameter 1286 and (b) a central void 1212 that is similar to void 512 and has a diameter 1282 which is smaller than inner diameter 1286. A tip 1214 extends from rotor 1210 toward fixture 520 inside void 1212. Void 1212 accommodates generator stator 740 which may form a hollow for accommodating tip 1214. Without departing from the scope hereof, tip 1214 may be omitted from flywheel system 1200.

Flywheel system 1200 further includes permanent magnets 742 positioned at a surface 1216 of void 1212. Windings 744 of generator stator 740 magnetically couple with permanent magnets 742 as discussed above in reference to FIG. 7. Groove 1232 accommodates electromagnets 534 mechanically coupled to fixture 520 and configured to magnetically couple with magnetizable elements 532 across a portion of groove 1232. Groove 1232 may further accommodate sensor(s) 536. Magnetizable elements 532 are mechanically coupled to, or integrated in, rotor 1210 and arranged along a diameter that is smaller than the diameter associated with electromagnets 534. In flywheel system 1200, magnetizable elements 532 and electromagnets 534 cooperate to form an active magnetic bearing magnetic.

Flywheel system 1200 may include one or more passive backup bearings 910. FIG. 12 shows exemplary locations of such bearings 910. Alternatively, one or more passive backup bearings 910 may be positioned at least partly in groove 1232. In an embodiment, flywheel system 1200 includes permanent magnets 540 and 542 configured as discussed above in reference to FIG. 5.

Without departing from the scope hereof, rotor 1210 may be turned upside down in a manner similar to that discussed for rotor 1110 in reference to FIG. 11.

Also without departing from the scope hereof, active magnetic bearing 1230 and generator stator 740, and optionally passive magnetic bearing(s) 910, may be provided as a standalone integrated bearing module to be implemented in a third party flywheel system. This integrated bearing module may further include one or more of power supply 350, permanent magnets 540, and permanent magnets 542.

Figure 13:
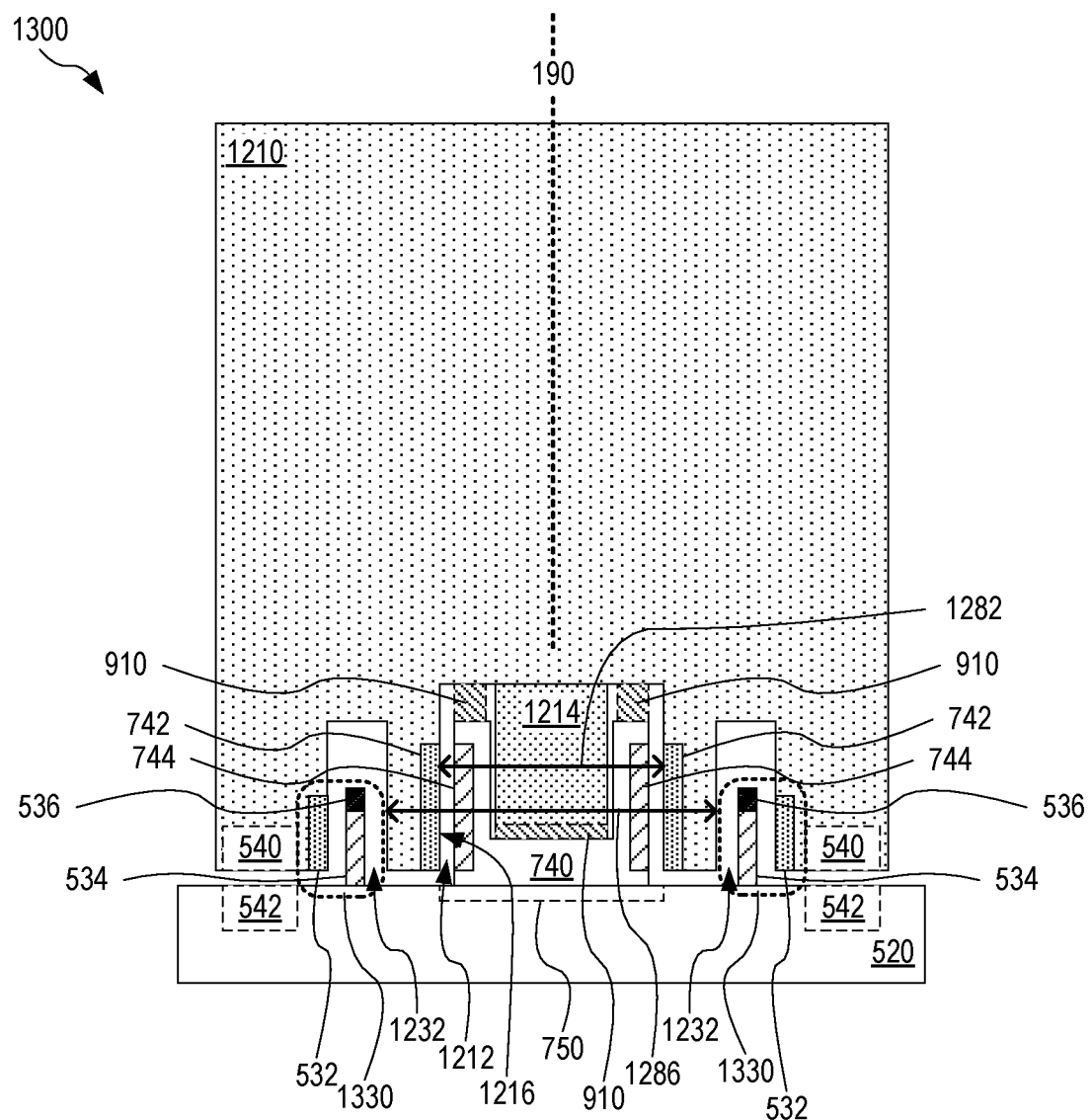
FIG. 13 illustrates another flywheel system including a generator and an active magnetic bearing positioned at greater radii than the generator, according to an embodiment.

FIG. 13 illustrates one flywheel system 1300 including generator stator 740, permanent magnets 742, and an active magnetic bearing 1330 positioned at greater radii than generator stator 740 and permanent magnets 742. Flywheel system 1300 is similar to flywheel system 1200 except that active magnetic bearing 1230 is replaced by active magnetic bearing 1330. Active magnetic bearing 1330 is similar to active magnetic bearing 1230 except that, in active magnetic bearing 1330, magnetizable elements 532 are disposed farther than electromagnets 534 from rotation axis 190.

Combinations of Features

Features described above as well as those claimed below may be combined in various ways without departing from the scope hereof. For example, it will be appreciated that aspects of one flywheel system or bearing module described herein may incorporate or swap features of another flywheel system or bearing module described herein. The following examples illustrate possible, non-limiting combinations of embodiments described above. It should be clear that many other changes and modifications may be made to the methods and device herein without departing from the spirit and scope of this invention:

(A1) A flywheel system may include a rotor configured to rotate about a rotation axis, a fixture, and a bearing module for at least one of (a) supporting the rotor on the fixture and (b) stabilizing the rotor relative to the fixture.

(A2) In the flywheel system denoted as (A1), the bearing module may include an active magnetic bearing for actively stabilizing the rotor relative to the fixture.

(A3) In the flywheel system denoted as (A2), the active magnetic bearing may include a plurality of first magnetizable elements mechanically coupled to or integrated in the rotor, and a plurality of electromagnets mechanically coupled to the fixture and configured to magnetically couple with the plurality of first magnetizable elements to actively stabilize the rotor relative to the fixture.

(A4) In the flywheel system denoted as (A3), each of the first magnetizable elements may be a soft magnetic composite.

(A5) In either of the flywheel systems denoted as (A3) and (A4), each of the first magnetizable elements may be farther than each of the electromagnets from the rotation axis.

(A6) In any of the flywheel systems denoted as (A3) through (A5), the first magnetizable elements may be arranged along a first diameter about the rotation axis, and the electromagnets being arranged along a second diameter about the rotation axis, wherein the first diameter is greater than the second diameter.

(A7) In any of the flywheel systems denoted as (A3) through (A6), in dimensions orthogonal to the rotation axis, the electromagnets and the first magnetizable elements may be away from each other by a first radial gap, the first radial gap being in range between 2 and 10 millimeters (A8) In any of the flywheel systems denoted as (A3) through (A7), the rotor may form a first void encircling the rotation axis, and the plurality of first magnetizable elements may be positioned at a first surface of the first void that encircles the rotation axis and faces or faces away from the rotation axis.

(A9) In the flywheel system denoted as (A8), each of the first magnetizable elements may extend along a portion of the rotation axis.

(A10) In either of the flywheel systems denoted as (A8) and (A9), each of the electromagnets may be positioned in the first void to magnetically couple with the first magnetizable elements across a portion of the first void.

(A11) The flywheel system denoted as (A10) may further include (i) permanent magnets mechanically coupled to or integrated in the rotor and positioned at a second surface of the first void that encircles the rotation axis, and (ii) a generator stator mechanically coupled to the fixture and positioned in the first void to magnetically couple with the permanent magnets, so as to convert between rotational energy of the rotor and electric current in windings of the generator stator.

(A12) In the flywheel system denoted as (A11), the fixture may include an endplate positioned adjacent a top end or bottom end of the rotor, and the electromagnets and the generator stator may be attached to the endplate.

(A13) In the flywheel system denoted as (A12), the generator stator may be between the electromagnets and the endplate, and the second surface may be closer than the first surface to the endplate.

(A14) In the flywheel system denoted as (A12), the electromagnets may be between the generator stator and the endplate, and the first surface being closer than the second surface to the endplate.

(A15) In any of the flywheel systems denoted as (A12) through (A14), the endplate may form a base adjacent the bottom-end, and the flywheel system may further include (I) first load bearing magnets mechanically coupled to or integrated in the rotor at bottom surface of rotor, and (II) second load bearing magnets, mechanically coupled to the base, for magnetically coupling with the first load bearing magnets to magnetically levitate the rotor above the base.

(A16) Any of the flywheel systems denoted as (A12) through (A15) may further include, in the first void, at least one passive magnetic bearing for stabilizing the rotor relative to the fixture if the active magnetic bearing loses power.

(A17) In the flywheel system denoted as (A16), the at least one passive magnetic bearing may include a plurality of passive magnetic bearings located in different respective positions.

(A18) In the flywheel system denoted as (A16), each passive magnetic bearing may include second permanent magnets mechanically coupled to or integrated in the rotor, and third permanent magnets mechanically coupled to the fixture and positioned in the first void to magnetically couple with the second permanent magnets, so as to provide backup stabilization of the rotor relative to the fixture.

(A19) In any of the flywheel systems denoted as (A11) through (A12), each of the first surface and the second surface may face the rotation axis.

(A20) In the flywheel system denoted as (A19), the first surface and the second surface may be respective portions of a common cylindrical surface.

(A21) In the flywheel system denoted as (A19), diameter of the first surface may be different from diameter of the second surface.

(A22) In any of the flywheel systems denoted as (A19) through (A21), the first void may span across the rotation axis.

(A23) In the flywheel system denoted as (A10), the first void may be a groove that encircles the rotation axis but does not coincide with the rotation axis.

(A24) In the flywheel system denoted as (A23), the first surface may face away from the rotation axis, such that the first magnetizable elements are closer than the electromagnets to the rotation axis.

(A25) In either of the flywheel systems denoted as (A23) and (A24), the rotor may further form a central void closer than the groove to the rotation axis, and the flywheel system may further include permanent magnets mechanically coupled to or integrated in the rotor and positioned at a second surface of the central void that faces and encircles the rotation axis, and a generator stator mechanically coupled to the fixture and positioned in the central void to magnetically couple with the permanent magnets, so as to convert between rotational energy of the rotor and electric current in windings of the generator stator.

(A26) In the flywheel system denoted as (A25), the fixture may include an endplate positioned adjacent a top end or bottom end of the rotor, and the electromagnets and the generator stator may be attached to the endplate.

(A27) In the flywheel system denoted as (A26), the endplate may form a base positioned adjacent a bottom end of the rotor, and the flywheel system may further include (I) first load bearing magnets mechanically coupled to or integrated in the rotor at bottom surface of rotor, and (II) second load bearing magnets, mechanically coupled to the base, for magnetically coupling with the first load bearing magnets to magnetically levitate the rotor above the base.

(A28) Any of the flywheel systems denoted as (A25) through (A27) may further include, in one or both of the groove and the central void, at least one passive magnetic bearing for stabilizing the rotor relative to the fixture if the active magnetic bearing loses power.

(A29) In the flywheel system denoted as (A28), the at least one passive magnetic bearing may include a plurality of passive magnetic bearings located in different respective positions.

(A30) In either of the flywheel systems denoted as (A28) and (A29), each passive magnetic bearing may include second permanent magnets mechanically coupled to or integrated in the rotor, and third permanent magnets mechanically coupled to the fixture and positioned in the groove or the central void to magnetically couple with the second permanent magnets, so as to provide backup stabilization of the rotor relative to the fixture.

(A31) Any of the flywheel systems denoted as (A3) through (A30) may further include a power supply for powering the plurality of electromagnets to adjust position of the rotor relative to the fixture.

(A32) The flywheel system denoted as (A31) may further include at least one sensor for sensing a movement characteristic of the rotor relative to the fixture, wherein the at least one sensor is communicatively coupled with the power supply to enable adjustment of the position of the rotor relative to the fixture in response to the movement characteristic (A33) The flywheel system denoted as (A32) may further include at least one passive backup bearing that includes second permanent magnets for stabilizing the rotor relative to the fixture if the power supply fails to provide power to the one or more electromagnets.

(B1) A bearing module for a flywheel system may include a plurality of first magnetizable elements arranged along a first diameter and configured to be mechanically coupled to a rotor of the flywheel system, and a plurality of electromagnets configured to be mechanically coupled to a fixture and magnetically couple with the first magnetizable elements to stabilize the rotor relative to the fixture, wherein the electromagnets are bounded by a second diameter that is smaller than the first diameter to enable positioning of the electromagnets inside the first diameter.

(B2) In the bearing module denoted as (B1), each of the first magnetizable elements may be a soft magnet.

(B3) Either of the bearing modules denoted as (B1) and (B2) may further include at least one sensor for sensing a position characteristic of the rotor relative to the fixture, and a power supply, communicatively coupled with the at least one sensor, for powering the electromagnets to adjust position of the rotor relative to the fixture in response to the position characteristic.

(B4) Any of the bearing modules denoted as (B1) through (B3) may further include at least one passive magnetic bearing including (a) a plurality of first permanent magnets configured to be mechanically coupled to the rotor and (b) a plurality of second permanent magnets configured to be mechanically coupled to the fixture and magnetically couple with the first permanent magnets to stabilize the rotor relative to the fixture if the power supply fails to provide power to the electromagnets.

(B5) Any of the bearing modules denoted as (B1) through (B4) may further include a plurality of third permanent magnets arranged along a third diameter and configured to be mechanically coupled to the rotor, and a generator stator for magnetically coupling with the third permanent magnets, to convert between rotational energy of the rotor and electric current in windings of the generator stator.

(B6) In the bearing module denoted as (B5), the generator stator may be bounded by a fourth diameter that is smaller than the third diameter to enable positioning of the generator stator inside the third diameter.

(B7) In the bearing module denoted as (B6), the electromagnets may be mounted on the generator stator.

(B8) Any of the bearing modules denoted as (B1) through (B7) may further include first load bearing magnets configured to be mechanically coupled to the rotor, and second load bearing magnets configured to be mechanically coupled to the fixture and magnetically couple with the first load bearing magnets to magnetically levitate the rotor above the second load bearing magnets.

(C1) A bearing module integrated with a generator for use in a flywheel system may include (1) a plurality of permanent magnets arranged along a first diameter and configured to be mechanically coupled to a rotor of the flywheel system, (2) a generator stator configured to be mechanically coupled to a fixture, the generator stator being bounded by a second diameter that is smaller than the first diameter to enable positioning of the generator stator inside the first diameter to magnetically couple with the permanent magnets, so as to convert between rotational energy of the rotor and electric current in windings of the generator stator, and (3) an active magnetic bearing including (a) a plurality of first magnetizable elements arranged along a third diameter and configured to be mechanically coupled to the rotor, wherein the third diameter is greater than the first diameter to enable positioning of the first magnetizable elements at greater distance than the permanent magnets from rotation axis of the rotor, and (b) a plurality of electromagnets arranged along a fourth diameter and configured to be mechanically coupled to the fixture and magnetically couple with the first magnetizable elements, so as to actively stabilize the rotor relative to the fixture, wherein the fourth diameter is greater than the first diameter to enable positioning of the active magnetic bearing at greater distance than the permanent magnets from the rotation axis.

(C2) In the bearing module denoted as (C1), each of the first magnetizable elements may be a soft magnet.

(C3) In either of the bearing modules denoted as (C1) and (C2), the fourth diameter may be greater than the third diameter to enable positioning of the first magnetizable elements closer than the electromagnets to the rotation axis.

(C4) In either of the bearing modules denoted as (C1) and (C2), the fourth diameter may be smaller than the third diameter to enable positioning of the first magnetizable elements farther than the electromagnets from the rotation axis.

(C5) Any of the bearing modules denoted as (C1) through (C4) may further include an endplate that forms at least a portion of the fixture, and the generator stator and the electromagnets may be mounted on the endplate.

(C6) Any of the bearing modules denoted as (C1) through (C5) may further include first load bearing magnets configured to be mechanically coupled to the rotor, and second load bearing magnets configured to be mechanically coupled to the fixture and magnetically couple with the first load bearing magnets to magnetically levitate the rotor above the second load bearing magnets.

(C7) Any of the bearing module denoted as (C1) through (C6) may further include at least one sensor for sensing a position characteristic of the rotor relative to the fixture, and a power supply, communicatively coupled with the at least one sensor, for powering the electromagnets to adjust position of the rotor relative to the fixture in response to the position characteristic.

(C8) Any of the bearing modules denoted as (C1) through (C7) may further include at least one passive magnetic bearing including (a) a plurality of second permanent magnets configured to be mechanically coupled to the rotor and (b) a plurality of third permanent magnets configured to be mechanically coupled to the fixture and magnetically couple with the second permanent magnets to stabilize the rotor relative to the fixture if the power supply fails to provide power to the electromagnets.

Changes may be made in the above systems and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems and methods, which, as a matter of language, might be said to fall therebetween.

What is claimed is:
1. A flywheel system comprising:
   a fixture providing a base and a stator;
   a rotor having a cavity for receiving the stator;
   a generator/motor module comprising a plurality of permanent magnets mechanically coupled to the rotor and magnetically coupled to windings of the stator, wherein the generator/motor module is configured to convert between rotational energy of rotor and electrical energy in windings of the stator;
   an active magnetic bearing module for actively stabilizing the rotor relative to the fixture, the active magnetic bearing module comprising:
      a plurality of magnetizable elements mechanically coupled with the rotor, and
      a plurality of electromagnets mechanically coupled to a shaft and configured to magnetically couple with the plurality of magnetizable elements to actively stabilize the rotor relative to the shaft;
   wherein the windings of the generator/motor module are arranged around a rotation axis of the rotor at a first distance from the rotation axis of the rotor;
   wherein the electromagnets of the active magnetic bearing module are arranged around the rotation axis of the rotor at a second distance from the rotation axis of the rotor; and
   wherein the first distance is greater than or equal to the second distance.

2. The flywheel system according to claim 1, further comprising a levitation module configured to magnetically levitate the rotor above the base.

3. The flywheel system according to claim 2,
   wherein the levitation module comprises:
      a first set of permanent magnets mechanically coupled to the stator, and
      a second set of permanent magnets mechanically coupled to the rotor;

wherein the first and the second set of permanent magnets are configured to magnetically couple with each other to bear the load of the rotor to magnetically levitate the rotor above the base.

4. The flywheel system according to claim 3, wherein the stator is provided as a shaft for the rotor; the first and the second set of permanent magnets are configured to magnetically couple with each other in an axial direction of the shaft.

5. The flywheel system according to claim 1, wherein the rotor has a vertical rotation axis, wherein the base of the fixture is formed as a horizontal endplate for the rotor.

6. The flywheel system according to claim 1, wherein the generator/motor module and the active magnetic bearing module are arranged around the shaft at different distances to the base.

7. The flywheel system according to claim 1, wherein the generator/motor module is configured to operate in a generator mode and in a motor mode;
wherein in the generator mode, the generator stator is used to decelerate the rotation of rotor to generate electrical energy, in the form of electrical energy in the windings;
wherein in the motor mode, the generator stator uses electrical energy, supplied from an external source to the windings to accelerate the rotation of rotor and thereby increase the rotational energy of rotor.

8. The flywheel system according to claim 7, wherein the generator stator is configured for cooling the windings during operation.

9. The flywheel system according to claim 1, wherein the active magnetic bearing module is connected to a power supply for powering the plurality of electromagnets to adjust position of the rotor relative to the fixture, and at least one sensor is configured for sensing a movement characteristic of the rotor relative to the fixture; the at least one sensor being communicatively coupled with the power supply to enable adjustment of the position of the rotor relative to the fixture in response to the movement characteristic.

10. The flywheel system according to claim 1, wherein the active magnetic bearing module is connected to a power supply for powering the plurality of electromagnets to adjust position of the rotor relative to the fixture; the at least one sensor is configured for sensing a position characteristic of the rotor relative to the fixture, the at least one sensor being communicatively coupled with the power supply for powering the electromagnets to adjust position of the rotor relative to the fixture in response to the position characteristic.

11. The flywheel system according to claim 1, wherein the magnetic bearing module further includes one or more sensors and at least one power supply;
the one or more sensors senses a property of the position or motion of rotor relative to fixture and communicates this property to the power supply for controlling the current passing through the plurality of electromagnets.

12. The flywheel system according to claim 1, further comprising a sensor array coupled to the fixture; the sensor array being configured for sensing motion properties of the fixture;
the flywheel system is configured to impose limitations on the operation of flywheel system according to the sensed motion properties.

13. The flywheel system according to claim 12, wherein the imposed limitations on the operation of flywheel system includes limitation of at least one of (i) a rate of acceleration and (ii) a rate of deceleration of rotor during periods when fixture undergoes movement above a predefined threshold.

14. The flywheel system according to claim 1, wherein the plurality of magnetizable elements exceed an axial extent of the plurality of electromagnets of the active magnetic bearing module, such that the magnetic coupling between the plurality of magnetizable elements and the plurality of electromagnets remains stable in the presence of axial movement of rotor relative to fixture.

15. The flywheel system according to claim 14, wherein the axial extent of magnetizable elements exceed the axial extent of electromagnets by 10% in both axial directions.

16. The flywheel system according to claim 1, wherein the active magnetic bearing module in an axial direction of the stator is arranged in between the generator/motor module and the base of the fixture.

17. The flywheel system according to claim 16, wherein the cavity of the rotor is configured at the generator/motor module as a first cylinder surface having a first diameter, and at the active magnetic bearing module as a second cylinder surface having a second diameter, and wherein second diameter is larger or equals the first diameter.

18. The flywheel system according to claim 17, wherein the first diameter and the second diameter are identical such that first cylinder surface and the second cylinder surface are respective portions of a common cylindrical surface.

19. The flywheel system according to claim 1, wherein the plurality of magnetizable elements of the active magnetic bearing module and mechanically coupled with the rotor are arranged at a first diameter and the plurality of electromagnets of the active magnetic bearing module and mechanically coupled to the shaft are arranged at a second diameter, the first diameter being greater than the second diameter.

20. A flywheel system comprising:
a fixture providing a base and a stator;
a rotor having a cavity for receiving the stator;
a generator/motor module comprising a plurality of permanent magnets mechanically coupled to the rotor and magnetically coupled to windings of the stator, wherein the generator/motor module is configured to convert between rotational energy of rotor and electrical energy in windings of the stator;
an active magnetic bearing module for actively stabilizing the rotor relative to the fixture, the active magnetic bearing module comprising:
a plurality of magnetizable elements mechanically coupled with the rotor, and
a plurality of electromagnets mechanically coupled to a shaft and configured to magnetically couple with the plurality of magnetizable elements to actively stabilize the rotor relative to the shaft;
wherein the electromagnets of the active magnetic bearing module are arranged as a first ring around a rotation axis of the rotor;
wherein the magnetizable elements of the active magnetic bearing module are arranged as a second ring around the rotation axis of the rotor; and
wherein the first and second rings are arranged as concentric rings in a plane parallel to the base of the fixture, the first and second rings are configured as an inner ring and an outer ring, respectively.

* * * * *